United States Patent Office 2,959,223
Patented Nov. 8, 1960

---

2,959,223

METHOD OF FACILITATING PRODUCTION OF OIL OR GAS FROM A WELL PENETRATING A PETROLEUM-BEARING STRATUM CONTIGUOUS TO A WATER-BEARING ZONE

James A. Harmon and Jack Sutherlin, Wichita Falls, and Charles A. Pitts, Abilene, Tex., assignors to The Dow Chemical Company, Midland, Mich., a corporation of Delaware No Drawing. Filed Mar. 25, 1955, Ser. No. 496,922

12 Claims. (Cl. 166—22)

The invention relates to the treatment of oil and gas wells. It more particularly concerns an improved method of stimulating the production of wells, the producing formations of which may also yield water or brine.

One of the currently popular methods of stimulating or facilitating the flow of oil or gas into wells is to subject the producing formation to a hydraulic fracturing operation. In the fracturing operation, there is injected into the well and thence into the producing formation a liquid, such as oil (usually somewhat more viscous than the formation fluids), at a rate such that a high pressure is reached in the well hole where the fluid enters the formation. The pressure thus produced is sufficient to exceed the weight of the overburden of earth and the bonding strength of the earth formation and on attaining such pressures the resistance offered by the formation to the inflow of the liquid decreases. The occurrence of such a decrease in resistance to flow of the liquid being injected is generally regarded as evidence that fracturing or parting of the earth has occurred. By such fracturing flow channels are provided or extended from the well hole into the earth formation adjacent thereto whereby fluid flow from the earth into the well is facilitated. In order to deter the tendency for the fractures thus formed to close when the injection pressure is released, there is usually also injected into the fractures a propping material in the form of a mass of discrete particles, such as sand, which on being lodged in the fractures, provides a fluid permeable body through which fluids from the earth may reach the well.

In practicing this method, we have found that one of its disadvantages is the hydraulic fluid may produce fractures or channels which extend into water or brine-bearing earth and permit the flow of undesirable water or brine to the well as readily as the desired oil or gas. Available methods purporting to prevent the flow of water or brine in oil wells are difficult and time consuming to apply and are not generally suitable for use in wells which have been subjected to a fracturing operation. Accordingly, it is a desideratum in the art to provide a method of stimulating the flow of oil or gas wells without also stimulating undesirable water or brine production.

It is the principal object of the invention then to provide a method of facilitating production of oil or gas from a well penetrating a stratum bearing these fluids without encouraging the flow of water or brine to the well. Other objects and advantages will appear as the description of the invention proceeds.

The present invention is predicated upon the discovery that by injecting through the well bore into the earth formation from which oil and gas production is to be stimulated a slurry of a hydraulic cement in an oily non-aqueous vehicle immediately ahead of the injection of a fracturing fluid, oil and gas flow is facilitated without encouraging the flow of water or brine. In many wells in which water or brine normally accompanies oil or gas production, the invention provides a method of reducing, if not stopping, such water or brine flow while stimulating the oil or gas flow. The invention then consists of the improved well treating method herein fully described and particularly pointed out in the claims.

In carrying out the invention, an injection is made (before fracturing) of a hydraulic cement dispersed in an oily vehicle as a slurry, the vehicle being non-aqueous and compatible with petroleum oil. Various hydraulic cements are suitable for the purpose, for example, there may be used: (1) high-early-strength Portland cement. These Portland cements are characterized by having a higher than normal content of tricalcium silicate (60 to 70 percent) and are especially finely ground so that the specific surface of the particles of the cement is as much as 2400 to 2800 square centimeters per gram of the cement. Such cements have a rapid thickening time, usually less than an hour, on mixing with water. (2) Construction Portland cements. These are regular or standard Portland cements and have thickening times on mixing with water of 80 minutes to 150 minutes. Such cements usually contain a high percentage of tricalcium aluminate. The particles are of medium size for a cement, ranging in specific surface from 1500 to 1900 square centimeters per gram. Accelerators may be used advantageously in such cements to increase the rate of thickening and hardening. (3) Oil well cements. These are Portland cements having thickening times of about 100 to 140 minutes. They contain less than the normal percentage of tricalcium aluminate and a higher than normal percentage of tricalcium aluminoferrite. These cements are usually sulfate resistant. The particles of these cements have a specific surface ranging from 1100 to 1900 square centimeters per gram. (4) High-temperature or retarded Portland cement. High temperature and pressure tend greatly to shorten the thickening time of most Portland cements and to offset this property the retarded cement is more coarsely ground than usual so as to provide, for example, a specific surface of 1400 to 1600 square centimeters per gram. Its tricalcium aluminate content is relatively low and a retarder, such as sodium tannate, may be admixed with the cement. Such cements may require from 140 to 240 minutes to thicken on becoming hydrolyzed with water. (5) Gel cements. These are Portland cements to which finely ground bentonite has been added. The bentonite decreases the setting time slightly. (6) Fiber cements. These are Portland cements to which has been added fibrous materials, such as cotton seed hulls, shredded paper or cellophane, mica flakes, asbestos fiber or sugar cane fiber, or the like. (7) Acid-soluble cements. These are Portland cements to which has been added a very finely ground easily acid-soluble material, such as calcium carbonate (limestone). Such cements when set are more or less readily soluble in an acid, such as hydrochloric. The thickening rate of such cements is not materially different from that of the Portland cement of which the acid-soluble cement mixture is made. Such cement mixtures may also contain up to about 3 percent of bentonite without interfering with their acid solubility. (8) Sand-cement mixtures. These are mixtures of Portland cement and sand and have a somewhat shorter setting time than that of the cement alone due to the water absorption effect of the sand present in the mixture. (9) Gypsum cement. This material is finely ground at least partially dehydrated calcium sulfate. On mixing with water in amount to form the hydrate, $CaSO_4.2H_2O$, setting occurs. This cement sets and hardens to full strength in about the same time, usually 2 hours, after the addition of water. (10) High alumina Portland cement. These are manufactured by sintering or heating until molten a mixture of limestone and bauxite. When cool, the resulting clinker is finely ground.

The setting time for this type of cement is about the same as that of ordinary Portland cement but develops strength much more rapidly after setting. Such cements are as strong 24 hours after hydration as ordinary Portland cement after 28 days. (11) Iron oxide cement. These Portland cements are prepared in the same way as ordinary Portland cement but hematite (iron ore) is substituted for the clay or shale usually used. This cement is especially resistant to the destructive effect of saline waters.

In preparing the cement slurry for use in the invention, any of the foregoing hydraulic cements are dispersed in a non-aqueous oily vehicle examples of which are kerosene, diesel oil, crude petroleum oil, and refined petroleum oils. These oils are compatible with those in petroleum-bearing earth and may be injected thereinto without detriment. The relative amounts of cement and oily vehicle which may be used are not sharply critical, the proportions used being those giving a pumpable slurry. For example, there may be used from about 300 to 2400 pounds of hydraulic cement per 100 gallons of oily vehicle. A preferred proportion is about 1600 pounds of cement per 100 gallons of vehicle.

If desired a surface tension lowering agent may be added to the cement slurry to facilitate its penetration into the earth and hydration of the cement by the water encountered by the slurry on being lodged in the earth formation.

The volume of slurry to use may vary over a wide range as for example from 200 to 1000 gallons for a 10 foot section of well hole but other amounts may be used. For larger or smaller sections of a well hole proportionally larger or smaller amounts respectively may be used. The injection of the cement slurry is made in a manner similar to that used in conventional squeeze cementing. For example, a string of tubing carrying a packer at the lower end may be run into the well to the section to be treated and the packer set at or above the top of the section. The cement slurry is then pumped through the tubing at a pressure sufficient to force it into the formation. Prior to making the injection of the cement slurry, it is desirable to fill the well with oil and to circulate out water, if any, in the well hole by lowering a tubing string to bottom and injecting oil down the casing. In this way, water in the well hole is forced up the tubing out of the well leaving the well hole filled with oil.

The injection of cement slurry is made through the tubing string leaving the packer unseated at first so that oil in the tubing ahead of the slurry may pass from the tubing into the well hole and displace oil from the annular space between the tubing string of the well hole until the cement slurry is about to emerge from the bottom of the tubing and enter the well hole. Before the cement slurry is about to emerge from the bottom of the tubing, the tubing should be raised so that the lower end is at about the elevation of the top of the zone or section to be treated. The packer is then seated and the injection of cement slurry continued until the entire charge has been introduced into the tubing. In deep wells, because of the relatively large volume of the bore of the tubing string, the entire charge of slurry may be introduced into the tubing before any emerges from the bottom. In that case it is necessary to follow the charge of slurry with some oil before the slurry will emerge from the bottom of the string. In any case additional oil must be injected into the tubing to displace the slurry into the well and earth formation to complete the injection and clear the tubing.

The rate of injection of the slurry is subject to control as desired and may be as much as 80 to 100 gallons per minute or more. In general the pressure during the injection is greater than would be encountered on injecting the vehicle alone at the same rate. This difference in injection pressure is the result of the lower fluid loss characteristics of the slurry as compared to that of the vehicle alone. Also the cement particles, on entering the earth formation and encountering water therein, begin to hydrate and the slurry begins to thicken and more or less block the passages entered by the slurry. It may be desirable, in those instances in which but little resistance to injection is encountered, to interrupt the injection periodically, with a waiting period of up to about 20 minutes at each interruption, for example, to allow some time for thickening of the slurry to occur rather than to inject the entire charge of slurry in one continuous injection operation. In this way higher injection pressures may be attained with beneficial results on the sealing effect produced in the formation.

After the slurry is injected into the earth formation and a relatively high injection pressure is attained, e.g. pressures as high as those equivalent to the weight per unit area of the overburden of earth at the depth involved, by allowing sufficient time for hydration and thickening of the slurry during the injection, the packer is unseated and any slurry remaining in the well hole is removed by injecting oil (e.g. lease oil) into the annulus while venting the head of the tubing to the atmosphere. In this way, any slurry in the well hole not injected into the formation is washed out through the tubing string.

The same earth formation after injecting the cement slurry into it is then subjected to a hydraulic fracturing treatment as by the injection thereinto of a liquid preferably petroleum oil at a rate sufficient to develop within the well hole adjacent to the formation to be fractured a pressure exceeding the bonding strength of the earth and the weight per unit area of the overburden as understood in the art of fracturing well formations. Various liquids may be used for the purpose. It is usual to employ crude oil or lease oil at least at first to secure a break down of the formation and the injection of lease or crude oil may be followed by a low penetrating fluid, such as a viscous or thickened petroleum oil which may have a viscosity of at least 30 centipoises to as much as 5000 cps. If desired break down of the formation may be effected by the injection of the viscous or thickened oil without a prior break down with ordinary oil. In any case, it is desirable to inject sand or other propping material into the fractures so as to hold them open and provide therein fluid permeable masses which remain lodged in the earth on releasing the injection pressure. Thereafter the well may be put into production.

The foregoing method eliminates waiting on the cement to reach a final set. Instead advantage is taken of the quick gelling and thickening of the slurry which occur as it contacts water in the formation. The cement, as carried in the non-aqueous oily vehicle, quickly absorbs water and the slurry thickens producing almost immediate pore plugging. This permits the immediate use thereafter of hydraulic fracturing pressures in the well hole which pressures not only produce passageways by fracturing for oil or gas to reach the well but also ensure driving unset cement slurry into the water coarses which would otherwise release water to the well on putting it into production. Where the cement is lodged, permanent sealing follows in time as the cement takes a final set.

The following example is illustrative of the practice of the invention:

*Example*

A well in Callahan County, State of Texas, was drilled for oil to a total depth of 1820 feet, cased with 5½ inch casing, the casing being cemented in place with 75 sacks of cement in the usual manner. The casing was perforated in the interval between 1767 feet and 1776 feet with six foot shots per foot. The 9 foot interval between the aforementioned depths was the thickness of the pay formation but the well produced from 300 to 400 barrels of water per day and no oil. With this well the problem was to stimulate oil production while reducing the water production. The well, with a string of 2 inch tubing in it and a Guiberson packer on the bottom of the string, the packer being located at 1780 feet but not set, was then treated in accordance with the invention as follows: Lease oil was injected into the well via the annulus between the casing and tubing string while venting the tubing thereby displacing the water in the well with lease oil through the tubing string. The tubing string was then raised and the packer set at 1747 feet. The volume of the tubing string plus that of the casing from the packer to the perforations was about 300 gallons. A charge of 500 gallons of cement slurry was prepared by mixing together 60 sacks (5640 pounds) of Portland cement, having a specific surface of more than 1100 square centimeters per gram, 310 gallons of diesel oil, and 2 gallons of a surfactant consisting of an alkylated aryl polyether alcohol, e.g. Triton X 100, Rohm & Haas Company. The introduction into the tubing of the slurry so-prepared was then begun while allowing oil to be displaced from the well hole into the earth through the perforations. The pressure at the tubing head during the introduction of the slurry into the tubing was 600 p.s.i. until the slurry began to enter the earth formation at which time the injection pressure increased to 750 p.s.i. at the same pumping rate. In the next 32 minutes as the slurry was injected through the perforations, the injection was interrupted several times, the amount of slurry injected between the interruptions, which lasted a few minutes each, being 30 gallons or more until a total of 440 gallons was injected into the earth and the injection pressure reached 4200 p.s.i. The remaining 60 gallons of the charge was then removed from the well by unseating the packer and injecting lease oil down the annulus while venting the head of the tubing to a storage tank. The well was then left idle for 3 hours and 18 minutes and preparations were made during this time for the next portion of the treatment, viz. the hydraulic fracturing operation. In this operation, lease oil was injected into the well at the rate of 10 gallons per minute, thereby producing a pressure at the well head of 2000 p.s.i. Thereupon the injection rate was increased to 42 gallons per minute without increase in pressure, thereby indicating that the formation was fractured. Following the injection of lease oil, 350 gallons of viscous oil (viscosity 400 cps.) containing 500 pounds of 20 to 40 mesh Ottawa sand was introduced into the tubing string and displaced into the formation through the perforations by lease oil at a pressure of 2000 p.s.i. and a rate of 0.9 barrel per minute. Shortly after making the injection of the mixture of viscous oil and sand, the well was put into production. It thereupon produced oil at the rate of 40 barrels per day with only 65 barrels of water.

By the foregoing method, wells in oil-bearing strata which produce water or brine with little or no oil can be made to yield oil while reducing or stopping the water or brine flow. The method has the further advantage of being easily and quickly carried out since not more than 4 hours need elapse between making the injection of cement slurry and carrying out the fracturing operation. Promptly thereafter the well may be put into production.

We claim:

1. The method of treating a well penetrating a petroleum-bearing formation which admits water or brine to the well so as to stimulate oil or gas flow while impeding water or brine flow to the well which comprises making an injection into the petroleum-bearing formation through the well of a slurry of a hydraulic cement in an oily non-aqueous vehicle inert to the cement and compatible with the petroleum of the formation, the cement particles becoming hydrated and the slurry thickened on contacting water in the formation whereby the pressure required for the injection increases, followed by subjecting the so-treated earth formation to a hydraulic fracturing operation within 4 hours by injecting into the earth formation a petroleum oil at a rate sufficient to produce a formation break-down pressure in the well hole, and promptly thereafter putting the well into production.

2. The method according to claim 1 in which the hydraulic cement is Portland cement and the vehicle is a petroleum oil.

3. The method according to claim 2 in which the hydraulic fracturing operation is performed with a viscous petroleum oil.

4. The method according to claim 3 in which the slurry comprises from 300 to 2400 pounds of Portland cement per 100 gallons of petroleum oil and viscous petroleum oil carries sand in suspension.

5. The method of treating a well penetrating a petroleum-bearing formation which admits water or brine to the well so as to stimulate oil or gas flow while impeding water or brine flow to the well which comprises making an injection into the petroleum-bearing formation through the well of a slurry of a hydraulic cement in an oily non-aqueous vehicle inert to the cement and compatible with petroleum oils, periodically interrupting the injection so as to provide time for the cement particles to hydrate and the slurry to thicken on contacting water in the formation whereby the pressure required for the injection is increased on resuming the injection after an interruption, and upon completion of the injection of the slurry but before the cement has set subjecting the same earth formation to a hydraulic fracturing operation by the injection into the said earth formation of a fluid comprising a petroleum oil at a rate sufficient to produce in the well hole a formation break-down pressure.

6. The method according to claim 5 in which the injection of the fluid comprising a petroleum oil is followed by the injection of a low penetrating or viscous fluid having dispersed therein particles of propping agent.

7. The method according to claim 6 in which the low penetrating fluid is a thickened petroleum oil having a viscosity of from 30 to 5000 centipoises at 100° F.

8. A process for treating a well formation containing both oil and water strata which comprises the steps of displacing water from a well bore and that formation immediately surrounding said well bore, injecting a non-aqueous slurry comprised of cement, a surface active agent, and an anhydrous oil into placement in said formation, allowing said slurry to thicken upon contact with water contained in said water strata, fracturing said formation by hydraulic injection of a fracturing fluid, the thickened slurry preventing fracture of said water strata, and producing said formation after setting of the thickened slurry.

9. The process as defined in claim 8 wherein the surface active agent is nonionic.

10. A process for treating a well formation containing both oil and water strata comprising the steps of, displacing water from a well bore and that formation immediately surrounding said well bore, injecting a non-aqueous slurry comprised of cement, a surface active agent, and an anhydrous oil into placement in said formation, allowing said slurry to thicken upon contact with water contained in said formation, fracturing said formation by hydraulic injection of a fracturing fluid, the thickened slurry being adapted to prevent fracture of water bearing strata of said formation, and producing said formation after setting of the thickened slurry.

11. A process for treating a well formation containing both oil and water comprising the steps of, injecting a non-aqueous fluid into a well bore sufficient to displace water from said well bore and that formation immediately surrounding said well bore, injecting an oil-cement slurry into placement in said surrounding formation, allowing said slurry to thicken upon contact with any water contained in said formation, said slurry being adapted to undergo a great and rapid increase in viscosity upon such contact, injecting sufficient fracturing fluid into said well bore to fracture said formation, said thickened slurry being adapted to prevent fracturing of water containing strata of said formation, and producing said formation after said thickened slurry has set.

12. The process defined in claim 11 wherein siad fracturing fluid has a propping aggregate suspended therein.

References Cited in the file of this patent

UNITED STATES PATENTS

| | | |
|---|---|---|
| 1,107,979 | Mitchell | Aug. 18, 1914 |
| 2,146,480 | Kennedy | Feb. 7, 1939 |
| 2,285,302 | Patterson | June 2, 1942 |
| 2,379,516 | Garrison | July 3, 1945 |
| 2,596,844 | Clark | May 13, 1952 |
| 2,645,291 | Voorhees | July 14, 1953 |
| 2,699,213 | Cardwell et al. | Jan. 11, 1955 |
| 2,734,861 | Scott | Feb. 14, 1956 |
| 2,782,857 | Clark | Feb. 26, 1957 |
| 2,796,131 | Hinchliffe et al. | June 18, 1957 |